(12) United States Patent
Morita et al.

(10) Patent No.: US 8,877,334 B2
(45) Date of Patent: Nov. 4, 2014

(54) SURFACE PROTECTION FILM

(75) Inventors: Hironobu Morita, Saitama (JP); Shigeru Aoki, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 0 days.

(21) Appl. No.: 13/260,357

(22) PCT Filed: Mar. 9, 2010

(86) PCT No.: PCT/JP2010/053894
§ 371 (c)(1),
(2), (4) Date: Sep. 25, 2011

(87) PCT Pub. No.: WO2010/113605
PCT Pub. Date: Oct. 7, 2010

(65) Prior Publication Data
US 2012/0034450 A1    Feb. 9, 2012

(30) Foreign Application Priority Data
Mar. 31, 2009  (JP) .................. 2009-087501

(51) Int. Cl.
*C08J 7/04*  (2006.01)
*B32B 27/08*  (2006.01)

(52) U.S. Cl.
CPC ...................... *C08J 7/047* (2013.01)
USPC ............ 428/331; 428/323; 428/341; 428/349

(58) Field of Classification Search
USPC .................. 428/331, 323, 341, 349
See application file for complete search history.

(56) References Cited

U.S. PATENT DOCUMENTS

| 6,043,194 A * | 3/2000 | Saito et al. .................. 503/227 |
| 2003/0174257 A1* | 9/2003 | Harada et al. ................ 349/12 |
| 2004/0157078 A1* | 8/2004 | Yoshida .................... 428/524 |
| 2005/0260414 A1* | 11/2005 | MacQueen .................... 428/421 |
| 2006/0132922 A1 | 6/2006 | Takao et al. |
| 2007/0291363 A1 | 12/2007 | Asakura et al. |
| 2009/0042017 A1* | 2/2009 | Kitahara et al. .............. 428/323 |

FOREIGN PATENT DOCUMENTS

| JP | 8-309910 A | 11/1996 |
| JP | 11-286083 A | 10/1999 |
| JP | 2007-34213 A | 2/2007 |
| JP | 2007-47722 A | 2/2007 |
| JP | 2007-293313 A | 11/2007 |
| JP | 2008-26883 A | 2/2008 |
| JP | 2008-134394 A | 6/2008 |
| WO | 2008/123257 A1 | 10/2008 |

OTHER PUBLICATIONS

Aerosil R974 product brochure Apr. 2008.*
International Search Report for PCT/JP2010/053894 dated Jun. 22, 2010.

* cited by examiner

*Primary Examiner* — Samir Shah
(74) *Attorney, Agent, or Firm* — Kenealy Vaidya LLP

(57) ABSTRACT

Provided is a surface protection film having a hard-coat property, an anti-glare property and transparency as well as a sufficient weather resistance property. A surface protection layer is provided on at least one surface of a substrate film, the surface protection layer is formed by a cured paint comprising an ionizing radiation curable resin composition, a matting agent, an ultraviolet ray absorbing agent, a dispersant and inorganic fine particles having an average primary particle diameter of 50 nm or smaller whose surfaces are subjected to a hydrophobization treatment with dimethyldichlorosilane. The inorganic fine particles are included by 200 parts or more by weight with respect to 100 parts by weight of a dispersant. The inorganic fine particles can be silica.

12 Claims, No Drawings

SURFACE PROTECTION FILM

This application is a U.S. national phase filing under 35 U.S.C. §371 of PCT Application No. PCT/JP2010/053894, filed Mar. 9, 2010, and claims priority under 35 U.S.C. §119 to Japanese patent application no. 2009-087501, filed Mar. 31, 2009, the entireties of both of which are incorporated herein by reference.

TECHNICAL FIELD

The presently disclosed subject matter relates to a surface protection film suitable for protecting surfaces of displays like posters and display screens of a variety of displays, etc., in particular, relates to a surface protection film suitable for protecting surfaces of displays and display screens used outdoors.

BACKGROUND ART

There has been proposed, as a surface protection film suitable for protecting surfaces of display screens of a variety of displays, etc., a surface protection film having a surface protection layer comprising an ionizing radiation curable resin and synthetic resin particles formed on one surface of a substrate film (refer to the patent document 1).

RELATED ART REFERENCE

Patent Document

Patent Document 1: Japanese Patent Unexamined Publication (Kokai) No. H08-309910 (claim 1)

SUMMARY

The surface protection film proposed in the patent document 1 is provided with a hard-coat property for protecting a surface from scratches, etc., an anti-glare property for preventing reflections of external lights and transparency for clearly viewing a display screen.

In recent years, there have been demands for a surface protection film for protecting surfaces of display screens of displays used outdoors, such as a portable navigation system (personal navigation device, hereinafter, referred to as PND). Such a surface protection film is required to have a weather-resistance property for protecting from the effects of rain, wind and heat and an ultraviolet ray from the sunlight, etc. in addition to a hard-coat property, an anti-glare property and transparency.

An aspect of the presently disclosed subject matter is to provide a surface protection film having a hard-coat property, an anti-glare property and transparency as well as a sufficient weather-resistance property.

A surface protection film, having a surface protection layer at least on one surface of a substrate film: wherein the surface protection layer is formed by a cured paint comprising an ionizing radiation curable resin composition, a matting agent, an ultraviolet ray absorbing agent, a dispersant and hydrophobized inorganic fine particles having an average primary particle diameter of 50 nm or smaller; and the inorganic fine particles are included by 200 parts or more by weight with respect to 100 parts by weight of a dispersant. The inorganic fine particles can be silica. Surfaces of the inorganic fine particles can be subjected to a hydrophobization treatment with dimethylchlorosilane.

Also, The surface protection film of the presently disclosed subject matter comprises a dispersant by 0.1 to 2.5 parts by weight with respect to 100 parts by weight of an ionizing radiation curable resin.

Note that an average particle diameter used in the presently disclosed subject matter is a value measured and calculated by a Coulter counter method.

The surface protection film of the presently disclosed subject matter has a hard-coat property, an anti-glare property, transparency and, in addition, a sufficient weather-resistance property, therefore, scratches on surfaces of displays and display screens used outdoors can be prevented, reflections of lights can be prevented, contents of displays and on display screens can be clearly viewed, and deterioration of the displays and display screens can be prevented.

The surface protection film of the presently disclosed subject matter has a surface protection layer on at least one surface of a substrate film, wherein the surface protection layer is formed by an ionizing radiation curable resin composition, an ultraviolet absorbent, a matting agent, a dispersant and hydrophobized inorganic particles having an average primary particle diameter of 50 nm or smaller. Below, embodiments of the respective components will be explained.

The substrate film is not particularly limited, but those having high transparency and a low b* value in the L*a*b* color space system (hereinafter, simply referred to as "b* value") are possible embodiments. Specifically, those having a b* value of 3.0 or lower and possibly 1.5 or lower are possible and, for example, polyethylene terephthalate, polybutylene terephthalate, polyethylene naphthalate, polycarbonate, polyethylene, polypropylene, polystyrene, triacetyl cellulose, acryl, polyvinyl chloride, norbornene compound, etc. may be mentioned. Particularly, a polyethylene terephthalate film subjected to biaxially-stretched can be used because of the mechanical strength and dimension stability, and it is possible to use those subjected to a treatment to enhance adhesion such as a plasma treatment, corona discharge treatment, far ultraviolet radiation treatment and formation of an undercoating easy-adhesive layer, etc. Also, a substrate film comprising an ultraviolet absorbing agent may be used to improve an ultraviolet ray prevention property and to obtain durability.

Note that the L*a*b* color space system means a color specification system represented according to the method for specifying colors defined by International Commission on Illumination (CIE) in 1976, and the b* value referred to in the presently disclosed subject matter means the value measured by transmittance and calculated according to JIS Z8722:1994 and JIS Z8729:2004.

A thickness of the substrate film as above is not particularly limited but, when considering handleability and mechanical strength, etc., it is 10 μm to 500 μm, possibly 50 μm to 300 μm or so.

Next, an explanation will be made on an ionizing radiation curable resin composition. An ionizing radiation curable resin composition is used as a binder component for holding an ultraviolet ray absorbing agent and a matting agent. By using an ionizing radiation curable resin composition, scratches on a surface of a surface protection layer can be prevented. As an ionizing radiation curable resin composition, photo-cationic polymerizable resins and photo-radical polymerizable photo-polymerizable prepolymers, which can be crosslinked and cured by being irradiated with an ionic radiation (ultraviolet ray or electron beam), may be used.

As photo-cationic polymerizable resins, bisphenol-type epoxy resins, novolac epoxy resins, alicyclic epoxy resins, aliphatic epoxy resins and other epoxy-type resins and vinyl ether-type resins, etc. may be mentioned.

As photo-radical polymerizable photo-polymerizable prepolymers, acrylic prepolymers which have two or more aclyloil groups in one molecule and come to have a three-dimensional network structure when crosslinked and cured can be used. As the acrylic prepolymers, urethane acrylates, polyester acrylates, epoxy acrylates, melamine acrylates, polyfluoroalkyl acrylates and silicon acrylates, etc. may be used and properly selected in accordance with a kind of a member to be coated and use purpose, etc. These acrylic prepolymers may be used alone, however, in order to give a variety of features, such as improving crosslinking, a curing property and adjusting curing shrinkage, etc., it is possible to add a photo-polymerizable monomer.

As photo-polymerizable monomers, 2-ethylhexyl acrylate, 2-hydroxyethyl acrylate, 2-hydroxypropyl acrylate, butoxyethyl acrylate and other monofunctional acrylic monomers; 1,6-hexanediol diacrylate, neopentyl glycol diacrylate, diethylene glycol diacrylate, polyethylene glycol diacrylate, hydroxypivalic acid ester neopentyl glycol diacrylate and other bifunctional acrylic monomers; dipentaerithritol hexaacrylate, trimethylpropane triacrylate, pentaerithritol triacrylate and other polyfunctional acrylic monomers may be used by one or more kinds.

When forming a surface protection layer of the presently disclosed subject matter, in the case of curing by ultraviolet ray irradiation for use, it is possible that additives, such as a photo-polymerization initiator, photo-polymerization accelerator and ultraviolet ray sensitizer, are used in a paint comprising the ionizing radiation curable resin composition.

As a photo-polymerization initiator, onium salts, sulphonic acid esters, organic metal complexes and other photo-cationic polymerization initiators; acetophenone, benzophenone, Michiler's ketone, benzoin, benzylmethylketal, benzoylbenzoate, α-acyloxime ester, thioxanthones and other photo-radical polymerization initiators may be mentioned.

As a photo-polymerization accelerator, p-dimethylaminobenzoic acid isoamyl ester and p-dimethylaminobenzoic acid ethyl ester, etc. may be mentioned. And as an ultraviolet ray sensitizer, n-butylamine, triethylamine, tri-n-butylphosphine, etc. may be mentioned.

Also, other resins, such as thermo-setting resins and thermoplastic resins, may be added as a binder component in addition to the ionizing radiation curable resin composition as above as far as it is in a range of not undermining the features of the presently disclosed subject matter.

Next, a matting agent will be explained. A matting agent is used for preventing reflections of external lights. A kind of matting agents is not particularly limited and calcium carbonate, magnesium carbonate, barium carbonate, aluminum carbonate, silica, kaolin, clay, talc and other inorganic particles; acrylic resin particles, polystyrene resin particles, polyurethane resin particles, polyethylene resin particles, benzoguanamine resin particles, epoxy resin particles and other resin particles may be used.

A shape of the matting agent is not particularly limited and a spherical form, oval form and irregular forms, etc. may be used. A size of the matting agent varies depending on a thickness of a surface protection layer and should not be flatly said, but it is possible that an average secondary particle diameter is at a lower limit of 0.5 μm or larger, furthermore, 1 μm or larger and at an upper limit of 20 μm or smaller and possibly 10 μm or smaller.

When the average secondary particle diameter is 1 μm or larger, protruding portions can be formed by the matting agent to give an excellent anti-glare property to the surface protection layer while giving furthermore sufficient weather resistance property. Namely, when the average secondary particle diameter of the matting agent is too small, a thickness of the surface protection layer has to be thinner in order to form protruding portions on the surface protection layer and it becomes likely that a sufficient weather resistance property cannot be obtained.

When the average secondary particle diameter of the matting agent is 20 μm or smaller, it is possible to prevent external haze from becoming too large and transparency can be maintained, and it is possible to prevent the matting agent comming off from the surface protection layer moreover. It is also possible to prevent making a thickness of the surface protection layer unnecessarily thick by preventing those. When the average secondary particle diameter of the matting agent is too large, the matting agent becomes bright point to cause a glare phenomenon and it is liable that an image displayed on a display cannot be clearly seen. Therefore, the average secondary particle diameter of the matting agent is possibly 20 μm or smaller.

A content of the matting agent in a surface protection layer is 0.5% by weight to 8% by weight and possibly 1% by weight to 6% by weight. When a content of the matting agent is 0.5% by weight or more, furthermore excellent anti-glare property can be given to the surface protection layer. It is 8% by weight or less because a decline of transparency can be prevented moreover.

Next, an explanation will be made on an ultraviolet ray absorbing agent. An ultraviolet ray absorbing agent is used for preventing a surface of displays and display screens from discoloration and fading due to the effects of ultraviolet ray, etc. Namely, it is used for preventing deterioration due to an ultraviolet ray (an ultraviolet ray preventing property) among features of a weather resistance property. As an ultraviolet ray absorbing agent, conventionally-known ultraviolet ray absorbing agents, for example, salicylic acid-type compounds, cyano acrylate-type compounds, benzophenone-type compounds and benzotriazole-type compounds may be mentioned. Among them, in terms of compatibility with the ionizing radiation curable resin composition and a weather resistance property when used outdoors as explained above, etc., benzophenone-type compounds and/or benzotriazole-type compounds are possibly used.

As benzophenone-type compounds, 2-hydroxy-4-methoxy benzophenone, 2,4-dihydroxy benzophenone, 2-hydroxy-4-n-octoxy benzophenone, 2-hydroxy-4-methoxy-2'-carboxy benzophenone, 2,2'-dihydroxy-4,4'-dimethoxy benzophenone, 2-hydroxy-4-benzoiloxy benzophenone, 2,2'-dihydroxy-4-methoxy benzophenone, 2-hydroxy-4-methoxy-5-sulfon benzophenone, 2,2',4,4'-tetrahydroxy benzophenone, 2,2'-dihydroxy-4,4'-dimethoxy benzophenone, 2-hydroxy-5-chlorbenzophenone, bis-(2-methoxy-4-hydroxy-5-benzoilphenyl)methane, etc. may be mentioned.

As benzotriazol-type compounds, 2-(2'-hydroxyphenyl)benzotriazol, 2-(2'-hydroxy-5'-methylphenyl)benzotriazol, 2-(2'-hydroxy-5-methylphenyl)-5-carboxylic acid butyl ester benzotriazol, 2-(2'-hydroxy-5'-methylphenyl)-5,6-dichlorbenzotriazol, 2-(2'-hydroxy-5'-methylphenyl)-5-ethylsulfon benzotriazol, 2-(2'-hydroxy-5'-t-butylphenyl)-5-chlorobenzotriazol, 2-(2'-hydroxy-5'-t-butylphenyl)benzotriazol, 2-(2'-hydroxy-5'-t-aminophenyl)benzotriazol, 2-(2'-hydroxy-3',5'-dimethylphenyl)benzotriazol, 2-(2'-hydroxy-3',5'-dimethylphenyl)-5-methoxy benzotriazol, 2-(2'-methyl-4'-hydroxyphenyl)benzotriazol, 2-(2'-stearyloxy-3',5'-dimethylphenyl)-5-methyl benzotriazol, 2-(2'-hydroxy-5-carboxylic acid phenyl)benzotriazol ethyl ester, 2-(2'-hydroxy-3'-methyl-5'-t-butylphenyl)benzotriazol, 2-(2'- hydroxy-3',5'-di-t-butylphenyl)-5-chlorobenzotriazol, 2-(2'-hydroxy-3'-t-butyl-5'-methylphenyl)-5-chlorobenzotriazol, 2-(2'-hydroxy-5'-methoxyphenyl)benzotriazol, 2-(2'-hydroxy-3',5'-di-t-butylphenyl)-5-chlorobenzotriazol, 2-(2'-hydroxy-5'-cyclohexylphenyl)benzotriazol, 2-(2'-hydroxy-4', 5'-dimethylphenyl)-5-carboxylic acid benzotriazol butyl ester, 2-(2'-hydroxy-3',5'-dichlorphenyl)benzotriazol, 2-(2'-hydroxy-4',5'-dichlorphenyl)benzotriazol, 2-(2'-hydroxy-3', 5'-dimethylphenyl)-5-ethylsulfon benzotriazol, 2-(2'-hydroxy-4'-octoxyphenyl)benzotriazol, 2-(2'-hydroxy-5'-methoxyphenyl)-5-methyl benzotriazol, 2-(2'-hydroxy-5'-methylphenyl)-5-carboxylic acid ester benzotriazol, 2-(2'-acetoxy-5'-methylphenyl)benzotriazol, 2-(2'-hydroxy-5'-t-octylphenyl)benzotriazol, etc. may be mentioned.

Furthermore, oligomers and polymers of these benzophenone-type compounds and benzotriazol-type compounds may be mentioned. When these benzophenone-type compounds and benzotriazol-type compounds are used by one kind or by mixing two or more kinds properly, an ultraviolet ray prevention property can be sufficiently given.

A content of an ultraviolet ray absorbing agent varies depending on a kind of ultraviolet ray absorbing agent to be used and a thickness of a surface protection layer, etc. and should not be flatly said, but it is possibly at a lower limit of 1 part by weight or more, furthermore, 5 parts by weight or more and possibly at an upper limit of 20 parts by weight or less, furthermore, 15 parts by weight or less. When a content of an ultraviolet ray absorbing agent is 1 part by weight or more with respect to 100 parts by weight of a binder component, an ultraviolet ray prevention property as one of the features of a weather resistance property can be provided more. While when 20 parts by weight or less, the ionizing radiation curable resin composition explained above serves sufficiently as a binder component, and it is possible to furthermore prevent the ultraviolet absorbing agent and matting agent from flowing out from a surface protection layer due to the effects of rain, wind and heat of the sun. Namely, it is possible to prevent the features of a weather resistance property from deteriorating due to the effects of rain, wind and heat by sunlight. Also, a decline of a hard-coat property can be prevented more.

Next, an explanation will be made on a dispersant. A dispersant is used to improve dispersability when dispersing the matting agent explained above in a binder component and a diluent solvent, which is added in accordance with need. In a state where dispersability is poor, aggregated matting agent is present in a coating film, the aggregated matting agent becomes bright point to cause a glare phenomenon, and an image displayed on a display cannot be seen clearly, so that a dispersant has to be added in the presently disclosed subject matter. Also, by adding a dispersant, storage stability of an application liquid can be improved, such that it is possible to prevent a matting agent after being dispersed from depositing and secondary aggregation. Application stability is improved, such that dripping can be prevented at the time of applying it, and a leveling property at the time of forming a coating film can be improved, as well.

As such a dispersant, polymers are possible and, among them, those insoluble to water when made into a film are possible. As such a dispersant, for example, polyvinyl acetal-type resins, polyester acrylate-type resins, polyurethane acrylate-type resins, epoxy acrylate resins, polyester-type resins, acrylic resins, polycarbonate-type resins, epoxy-type resins, cellulose-type resins, acetal-type resins, vinyl-type resins, polyethylene-type resins, polystyrene-type resins, polypropylene-type resins, polyamide-type resins, polyimide-type resins, melamine-type resins, phenol-type resins, silicon-type resins, fluorine-type resins and other thermoplastic resins and thermo-setting resins, etc. may be mentioned. Among them, thermoplastic resins can be used in terms of excellent handleability, workability, dispersability and dispersion stability. Polyvinyl acetal-type resins can also be used among thermoplastic resins. In the case of using a surface protection film of the presently disclosed subject matter on a surface of a touch-panel, in terms of preventing forming of writing marks by an imputing tool like a touch-pen, etc., thermoplastic resins having a glass transition temperature (Tg) of 85° C. or higher are possibly used and, additionally a polyvinyl acetal resin (particularly, a butyral resin) having a Tg of 85° C. or higher can be used as a dispersant.

A content of a dispersant as such varies depending on a kind of the dispersant and should not be flatly said, but it is possibly included by 0.1 part by weight to 2.5 parts by weight and possibly 0.1 part by weight to 1.5 parts by weight with respect to 100 parts by weight of the ionizing radiation curable resin composition explained above. When it is 0.1 part by weight or more with respect to 100 parts by weight of the ionizing radiation curable resin composition, it is possible to improve dispersability when dispersing a matting agent, storage stability when made into an application liquid, coating stability at the time of applying and a leveling property when forming a coating film. When it is 2.5 parts by weight or less with respect to 100 parts by weight of the ionizing radiation curable resin composition, a decline of optical characteristics due to the effects of rain, wind and heat and an ultraviolet ray by sunlight, etc. can be prevented. While when a dispersant is included more than necessary, a hard-coat property of a coating film after formed into the coating film is liable to decline, which is unfavorable.

Next, an explanation will be made on inorganic fine particles. Inorganic fine particles are used for preventing a decline of a weather resistance property of a surface protection layer. A kind of inorganic fine particles as such is not particularly limited, and calcium carbonate, magnesium carbonate, barium sulfate, aluminum hydroxide, zirconium oxide, calcium stearate, silica, kaolin, clay and talc, etc. may be mentioned. In terms of a weather resistance property and dispersability, silica is possible.

Surfaces of the inorganic fine particles as such have to be subjected to a hydrophobization treatment. When a hydrophobization treatment is performed, transparency of a surface protection layer can be maintained. As a substance for performing a hydrophobization treatment on the inorganic fine particles (a hydrophobizing agent), dimethyldichlorosilane, octamethylcyclotetrasiloxane, dimethylpolysiloxane, methacryloxysilane, octylsilane, hexamethyldisilane, hexamethyldisilazane and other silylating agents may be mentioned. It can be hydrophobized by a dry method using dimethyldichlorosilane among them. A hydrophobization treatment by a dry method may be performed, for example, by heating at a high temperature and adding a silylating agent while agitating. Note that a hydrophobization treatment on inorganic fine particle surfaces is not limited to a dry method and may be performed by a wet method of treating by dispersing in a solvent, such as water and organic solvent.

A size of inorganic fine particles as such is at an upper limit of 50 nm or smaller, possibly 30 nm or smaller and furthermore can be 20 nm or smaller in an average primary particle diameter. When the average primary particle diameter of the inorganic fine particles is 50 nm or smaller, transparency of the surface protection layer can be maintained. It is also possible to prevent a weather resistance property from declining. The reason why a decline of the weather resistance property can be prevented is not all clear, but the inventors considered as below.

The surface protection film of the presently disclosed subject matter is suitable for protecting surfaces of display screens of a variety of displays and has an anti-glare property as a result of including a matting agent in the surface protection layer. However, when the matting agent is not fully dispersed and aggregate is present, transparency declines and the aggregated matting agent becomes a bright point to easily cause a glare phenomenon. Therefore, it is essential to add a dispersant to the surface protection layer in the presently disclosed subject matter. However, when the surface protection layer is added with a dispersant, it is liable that transparency, yellow tint and other optical characteristics are deteriorated due to the effects of rain, wind and heat and an ultraviolet ray by sunlight, etc. But when hydrophobized inorganic fine particles having an average primary particle diameter of 50 nm or smaller is added there, a bleeding phenomenon that the inorganic fine particles push up an ultraviolet ray absorbing agent when forming a surface protection layer (the method of forming a surface protection layer will be explained later on) occurs, and an ultraviolet ray is absorbed more on the surface, consequently, deterioration of inside the surface protection layer, deterioration of the dispersant in particular, is hardly caused. Namely, it is possible to prevent a decline of a weather resistance property.

A lower limit of a size of inorganic fine particles is not particularly limited, but can be 5 nm or larger and furthermore 8 nm or larger in an average primary particle diameter in terms of handleability, dispersibility and coating stability at the time of applying.

A content of inorganic fine particles is 200 parts by weight or more, possibly 300 parts by weight or more with respect to 100 parts by weight of a dispersant. When the content of inorganic fine particles is 200 parts by weight or more with respect to 100 parts by weight of a dispersant, a decline of a weather resistance property can be prevented. Furthermore, it is possible to improve dispersion stability after dispersing a matting agent, storage stability when made into an application liquid, coating stability at the time of applying and a leveling property when forming a coating film. Also, an upper limit of inorganic fine particles is not particularly limited, but can be 800 parts by weight or less and furthermore 700 parts by weight or less with respect to 100 parts by weight of a dispersant. The reason why the upper limit of the contend of inorganic fine particles is 800 parts by weight with respect to 100 parts by weight of a dispersant is that, when the inorganic fine particles are included more than necessary, the effect of suppressing a decline of a weather resistance property remains same but it is liable to result in a decline of transparency.

Next, a thickness of a surface protection layer varies depending on a size of a matting agent and a content of an ultraviolet ray absorbing agent, etc. and it should not be flatly said, but the thickness is 20% to 80%, possibly 40% to 70% of an average secondary particle diameter of a matting agent. When it is 20% or more with respect to an average secondary particle diameter of a matting agent, it is possible to prevent the matting agent comming off from a surface protection layer, and a weather resistance property and required minimum surface hardness can be easily obtained. Also, when it is 80% or less with respect to the average particle secondary diameter of a matting agent, protruding portions by the matting agent on a surface of a surface protection layer can be easily formed and an anti-glare property can be provided.

Specifically, a thickness of a surface protection layer is possibly 1 μm to 15 μm or so and furthermore 3 μm to 10 μm or so. When the thickness of a surface protection layer is 1 μm or thicker, a matting agent can be prevented comming off from the surface protection layer, and a sufficient hard-coat property and necessary weather resistance property can be more easily provided. While when it is 15 μm or thinner, protruding portions by a matting agent can be formed on a surface of the surface protection layer, forming of curls due to curing shrinkage can be prevented, and a decline of a hard-coat property due to insufficient curing can be prevented more.

A surface protection layer may include a variety of additives, such as other resins, other fine particles, lubricants, fluorescent whitening agents, pigments, colorants, antistatic agents, fire retardants, antibacterial agents, antifungus agents, antioxidants, plasticizers, leveling agents, flow modifiers, defoaming agents, other dispersants, crosslinking agents and photostabilizers.

The surface protection film as such can be obtained, for example, by producing a surface protection layer application liquid by mixing the ionizing radiation curable resin composition as above, a matting agent, an ultraviolet absorbing agent, a dispersant and hydrophobized inorganic fine particles having an average primary particle diameter of 50 nm or smaller with, in accordance with need, a diluent solvent or additives, etc., dispersing and adjusting; then, after applying the surface protection layer application liquid to at least one surface of a substrate film as explained above by a conventionally well-known coating method of, for example, bar coater, dye coater, blade coater, spin coater, roll coater, gravure coater, flow coater, spray and screen printing; drying if necessary, curing by irradiating an ionic radiation and forming a surface protection layer.

Also, a method of manufacturing a surface protection layer application liquid is, for example, by obtaining a matting agent dispersion liquid by mixing a matting agent, a dispersant, hydrophobized inorganic fine particles having an average primary particle diameter of 50 nm or smaller and a diluent solvent and dispersing; obtaining a binder component liquid by mixing and adjusting an ionizing radiation curable resin composition, an ultraviolet ray absorbing agent and, in accordance with need, additives and a diluent solvent; and mixing the matting agent dispersion liquid with the binder component liquid in proper amounts.

Also, a method of irradiating an ionic radiation may be irradiating an ultraviolet ray having a wavelength range of 100 nm to 400 nm and can be 200 nm to 400 nm generated from an ultra-high pressure mercury lamp, high pressure mercury lamp, low pressure mercury lamp, carbon arc and metal halide lamp, etc. or irradiating an electron beam having a wavelength range of 100 nm or shorter generated from a scanning type or curtain type electron beam accelerator.

As explained above, according to a surface protection film of the presently disclosed subject matter, because it is provided with a hard-coat property, an anti-glare property and transparency and provided with a sufficient weather resistance property, it is possible to prevent scratches on surfaces of displays, such as posters, and display screens of a variety of displays, reflections of lights can be prevented, contents of displays and on display screens can be clearly viewed, and deterioration of displays and display screens can be prevented.

EXAMPLES

Below, the presently disclosed subject matter will be explained furthermore in detail based on examples. Note that "part" and "%" are based on weight in the examples below unless otherwise mentioned.

Example 1

On one surface of a polyester film as a substrate film having a thickness of 188 μm, a surface protection layer application liquid formulated as below was applied, dried, and irradiated with an ultraviolet ray from a high-pressure mercury lamp (irradiation dosage of 400 mJ/cm$^2$) to form a surface protection layer having a thickness of 10 μm, so that a surface protection film of an example 1 was produced.

Note that the surface protection layer application liquid was produced by respectively producing a matting agent dispersion liquid and a binder component liquid formulated as below and, then, mixing the both (dispersant: hydrophobized inorganic fine particles=100:325).

<Formula of Matting Agent Dispersion Liquid of Example 1>
- matting agent: 1.3 parts (silica having an average secondary particle diameter of 4.5 μm) (Sylysia 446: FUJI SILYSIA CHEMICAL LTD.)
- dispersant: 0.4 part (a thermoplastic polyvinyl acetal resin having a Tg of 90° C.) (solid content 100%) (S-LEC BX-1: Sekisui Chemical Co., Ltd.)
- hydrophobized inorganic fine particles: 1.3 parts (silica having an average primary particle diameter of 12 nm) (hydrophobization treatment by using dimethyldichlorosilane) (AEROSIL R974: Evonik Degussa GmbH)
- methyl ethyl ketone: 4.4 parts
- propyrene monomethyl ether: 14.6 parts <Formula of Binder Component Liquid of Example 1>
- ionizing radiation curable resin composition: 30 parts (solid content 100%) (BEAMSET 575: Arakawa Chemical Industries, Ltd.)
- ultraviolet ray absorbing agent: 3 parts (TINUVIN 348-2: Ciba Japan KK)
- photo-polymerization initiator: 1.2 parts (IRGACURE 651: Ciba Japan KK)
- propylene glycol monomethyl ether: 30 parts
- butyl acetate: 13.8 parts <Formula of Surface Protection Layer Application Liquid of Example 1>
- matting agent dispersion liquid of Experimental example 1: 22 parts
- binder component liquid of Experimental example 1: 78 parts

Example 2

Other than changing an amount of the hydrophobized inorganic fine particles to 0.8 part (dispersant: hydrophobized inorganic fine particles=100:200) in the matting agent dispersion liquid of the example 1, a surface protection film of an example 2 was produced in the same way as in the example 1.

Example 3

Other than changing an amount of hydrophobized inorganic fine particles to 2 parts (dispersant: hydrophobized inorganic fine particles=100:500) in the matting agent dispersion liquid of the example 1, a surface protection film of an example 3 was produced in the same way as in the example 1.

Example 4

Other than changing the dispersant in the matting agent dispersion liquid of the example 1 from S-LEC BX-1 to a thermoplastic polyvinyl butyral resin having Tg of 68° C. (DENKA BUTYRAL #3000-2, solid content 100%, DENKI KAGAKU KOGYO KABUSHIKI KAISHA), a surface protection film of an example 4 was produced in the same way as in the example 1.

Example 5

Other than changing the dispersant in the matting agent dispersion liquid of the example 1 from S-LEC BX-1 to a thermoplastic polyvinyl acetal resin having Tg of 74° C. (S-LEC BX-L, solid content 100%, Sekisui Chemical Co., Ltd.), a surface protection film of an example 5 was produced in the same way as in the example 1.

Example 6

Other than changing the dispersant in the matting agent dispersion liquid of the example 1 from S-LEC BX-1 to a thermoplastic polyvinyl butyral resin having Tg of 85° C. (DENKA BUTYRAL #6000-EP, solid content 100%, DENKI KAGAKU KOGYO KABUSHIKI KAISHA), a surface protection film of an example 6 was produced in the same way as in the example 1.

Example 7

Other than changing the hydrophobized inorganic fine particles in the matting agent dispersion liquid of the example 1 to not-hydrophobized inorganic fine particles, a surface protection film of an example 7 was produced in the same way as in the example 1.

Example 8

Other than changing an amount of the hydrophonized inorganic fine particles to 0.4 part in the matting agent dispersion liquid of the example 1 (dispersant: hydrophobized inorganic fine particles=100:100), a surface protection film of an example 8 was produced in the same way as in the example 1.

Example 9

Other than not adding any hydrophobized inorganic fine particles to the matting agent dispersion liquid of the example 1, a surface protection film of an example 9 was produced in the same way as in the example 1.

In each of the surface protection films obtained in the respective examples explained above, on the other surface of the surface with the surface protection layer, a hard-coat layer application liquid formulated as below was applied, dried and irradiated with an ultraviolet ray from a high-pressure mercury lamp (irradiation dosage of 400 mJ/cm$^2$) to form a hard-coat layer having a thickness of 6 μm, so that samples of the respective examples were produced.

<Formula of Hard-Coat Layer Application Liquid>
- ionizing radiation curable resin composition: 10 parts (solid content 100%) (BEAMSET 575: Arakawa Chemical Industries, Ltd.)
- photo-polymerization initiator: 0.5 part (IRGACURE 651: Ciba Japan KK)
- propylene glycol monomethyl ether: 23 parts Next, these samples were evaluated as to an anti-glare property, transparency, an ultraviolet prevention property, adhesiveness, a hard-coat property and a weather resistance property. The evaluation results are shown in Table 1. Samples of the examples 1 and 4 to 6 were evaluated as to pen writing marks visibility. The evaluation results are shown in Table 2.

(1) Anti-Glare Property

The surface protection film was placed with its surface protection layer facing outside on a liquid crystal display displaying an image, and it was evaluated visually whether the displayed image became hard to see due to reflections of external lights or not. Those which prevented reflections and allowed the image to be easily seen were evaluated as "o", and those which did not prevent reflections and made the image hard to be seen were evaluated as "x".

(2) Transparency

Also, the surface protection film was placed with its surface protection layer facing outside on a liquid crystal display displaying an image, and it was evaluated visually whether the displayed image is seen clearly or not. Those with which the displayed image was seen clearly were evaluated as "o" and those not seen clearly were evaluated as "x".

(3) Ultraviolet Ray Prevention Property

Light transmission for wavelength of 380 nm was measured by using a spectral photometer (UV-3101PC: Shimadzu Corporation). Those exhibited a light transmission of lower than 60% were evaluated as "o" and those 60% or higher were evaluated as "x".

(4) Adhesiveness

Based on a cross-cut tape method according to JIS-K5400: 1990, cuts were made to form 100 sections in a grid at 1 mm intervals, an adhesive cellophane tape conforming to JIS-Z1522 was put on, pressed with a ball of a finger to adhere, removed in the vertical direction. Then, a condition of a coating film after removing was visually confirmed and the number of removed sections was counted. Those with no removed sections were evaluated as "o" and those with removed sections were evaluated as "x".

(5) Hard-Coat Property

A pencil scratch value on the surface protection layer surface was measured by a method according to JIS K5400:1990. Those with an obtained measurement value of 2H or higher were evaluated as "o" and those with lower than 2H were evaluated as "x".

(6) Weather Resistance Property

A weather resistance property test according to ASTM-G154 was conducted under the following condition, and changes of Gloss, HAZE and a b* value were measured on the samples after the test. Note that ASTM is an abbreviation for American Standards Testing Material.

[Condition]

A: dark, water condensation state, 50° C.±3° C.
B: bright, UV-B irradiation (peak at 313 nm, JIS K5600-7-8, spectral radiant energy of 0.63 W/m²/nm), 60° C.±3° C.

Four hours in A condition once and four hours in B condition once were defined as one cycle, and it was repeated for 25 cycles (testing device: UV2000, Atlas)

(6)-1. Gloss

Samples before the weather resistance property test and those after the test were set on a gloss meter VG2000 (NIPPON DENSHOKU INDUSTRIES CO., LTD.) so that an incident light was irradiated on each of their surfaces with surface protection layer, and glossiness "%" (JIS-Z8741: 1997) at incoming and outgoing angle of 60° was measured. Then, a difference of values before and after the test (a value before the test—a value after the test) was obtained, and a change value of Gloss was calculated. As to the results, those exhibited a Gloss change value of 5% or lower were evaluated as "o" and those exceeding 5% were evaluated as "x".

(6)-2. Haze

Samples before the weather resistance property test and those after the test were set on a haze meter NDH2000 (NIPPON DENSHOKU INDUSTRIES CO., LTD.) so that an incident light was irradiated on the surface with the surface protection layer, and HAZE "%" (JIS-K7136: 2000) was measured. Then, a difference of values before and after the test (a value before the test—a value after the test) was obtained, and a change value of HAZE was calculated. As to the results, those exhibited a HAZE change value of 5% or lower were evaluated as "o" and those exceeding 5% were evaluated as "x".

(6)-3. b* Value

As to samples before the weather resistance property test and those after the test, a b* value was obtained by transmittance measurement by using a colormeter (ZE2000: NIPPON DENSHOKU INDUSTRIES CO., LTD.) based on JIS Z8722:1994 and JIS Z8729:2004. Then, a difference of the values before and after the test (a value before the test—a value after the test) was obtained, and a change value of b* value was calculated. As to the results, those exhibited a change value of a b* value of 2 or smaller were evaluated as "o" and those exceeding 2 were evaluated as "x".

(7) Pen Writing Mark Visibility

A surface protection film was heated at 150° C. for 60 minutes. After heating, it was left still at the room temperature (25° C.) for one hour. Then, the surface protection layer of the surface protection film was pressed with a stylus pen (material: a polyacetal resin, commodity number: SHARP MIC1A) along a straight-line grid (drawing with the stylus pen) and, after that, pen marks by the stylus pen was visually evaluated under a three band lamp (National FPL27EX-N, three band daylight white color). Those with no pen marks observed were evaluated as "o", those with some marks as "Δ" and those with clear marks observed were evaluated as "x".

TABLE 1

|  | (1) Anti-Glare Property | (2) Transparency | (3) Ultraviolet Ray Prevention Property | (4) Adhesiveness | (5) Hard-Coat Property | (6) After Weather Resistance Test | | |
|---|---|---|---|---|---|---|---|---|
|  |  |  |  |  |  | ⊿Gloss | ⊿HAZE | ⊿b* Value |
| Example 1 | o | o | o | o | o | o | o | o |
| Example 2 | o | o | o | o | o | o | o | o |
| Example 3 | o | o | o | o | o | o | o | o |
| Example 4 | o | o | o | o | o | o | o | o |
| Example 5 | o | o | o | o | o | o | o | o |
| Example 6 | o | o | o | o | o | o | o | o |

TABLE 1-continued

| | (1) Anti-Glare Property | (2) Transparency | (3) Ultraviolet Ray Prevention Property | (4) Adhesiveness | (5) Hard-Coat Property | (6) After Weather Resistance Test | | |
|---|---|---|---|---|---|---|---|---|
| | | | | | | ⊿Gloss | ⊿HAZE | ⊿b* Value |
| Example 7 | ○ | x | ○ | ○ | ○ | ○ | ○ | ○ |
| Example 8 | ○ | ○ | ○ | ○ | ○ | x | x | x |
| Example 9 | ○ | ○ | ○ | ○ | ○ | x | x | x |

TABLE 2

| | Dispersant Tg of Polyvinyl Acetal Resin | (7) Pen Writing Marks Visibility |
|---|---|---|
| Example 1 | 90° C. | ○ |
| Example 4 | 68° C. | X |
| Example 5 | 74° C. | Δ |
| Example 6 | 85° C. | ○ |

From the results of Table 1, the followings are understood. First, in the surface protection films of the examples 1 to 6, a surface protection layer can include or consist of an ionizing radiation curable resin composition, a matting agent, an ultraviolet ray absorbing agent, a dispersant and hydrophobized inorganic fine particles having an average primary particle diameter of 50 nm or smaller, wherein the inorganic fine particles were included by 200 parts or more by weight with respect to 100 parts by weight of the dispersant. Therefore, a decline of a weather resistance property was prevented and it was possible to improve dispersion stability after dispersing a matting agent, storage stability when made into an application liquid, coating stability at the time of applying and a leveling property when forming a coating film. Consequently, an anti-glare property, transparency and hard-coat property were excellent and a sufficient weather resistance property was obtained.

On the other hand, in the surface protection film of the example 7, the surface protection layer did not comprise hydrophobized inorganic fine particles having an average primary particle diameter of 50 nm or smaller but comprised not-hydrophobized inorganic fine particles. Therefore, dispersion stability after dispersing a matting agent, storage stability when made into an application liquid, coating stability at the time of applying and a leveling property when forming a coating film were deteriorated, consequently, the transparency became insufficient.

Also, in the surface protection film of the example 8, the surface protection layer can include or consist of an ionizing radiation curable resin composition, a matting agent, an ultraviolet ray absorbing agent, a dispersant and hydrophobized inorganic fine particles having an average primary particle diameter of 50 nm or smaller, therefore, an anti-glare property, transparency and a hard-coat property were excellent. However, a content of the inorganic fine particles was less than 200 parts by weight with respect to 100 parts by weight of the dispersant, a weather resistance property was insufficient.

Also, in the surface protection film of the example 8, the surface protection layer did not comprise hydrophobized inorganic fine particles having an average primary particle diameter of 50 nm or smaller, therefore, a decline of a weather resistance property could not be suppressed, and a weather resistance property became insufficient.

As shown in Table 2, as to pen marks visibility, it was confirmed that the visibility evaluation of pen marks by a stylus pen became different depending on Tg of a butyral resin used as a dispersant (examples 1 and 4 to 6).

The invention claimed is:

1. A surface protection film, having a surface protection layer at least on one surface of a substrate film, wherein
   the surface protection layer is formed by a cured paint comprising an ionizing radiation curable resin composition, a matting agent, an ultraviolet ray absorbing agent, a dispersant and hydrophobized inorganic fine particles having an average primary particle diameter of 50 nm or smaller; and
   the inorganic fine particles are included by 200 parts to 800 parts by weight with respect to 100 parts by weight of the dispersant,
   wherein the dispersant is a polyvinyl acetal resin having a glass transition temperature of 85° C. or higher and wherein the matting agent has an average secondary particle diameter of 0.5 to 20 μm.

2. The surface protection film according to claim 1, wherein the inorganic fine particles are silica.

3. The surface protection film according to claim 2, wherein surfaces of the inorganic fine particles are subjected to a hydrophobization treatment with dimethylchlorosilane.

4. The surface protection film according to claim 2, wherein the dispersant is included by 0.1 to 2.5 parts by weight with respect to 100 parts by weight of an ionizing radiation curable resin.

5. The surface protection film according to claim 1, wherein surfaces of the inorganic fine particles are subjected to a hydrophobization treatment with dimethylchlorosilane.

6. The surface protection film according to claim 3, wherein the dispersant is included by 0.1 to 2.5 parts by weight with respect to 100 parts by weight of an ionizing radiation curable resin.

7. The surface protection film according to claim 3, wherein the dispersant is included by 0.1 to 2.5 parts by weight with respect to 100 parts by weight of an ionizing radiation curable resin.

8. The surface protection film according to claim 1, wherein the dispersant is included by 0.1 to 2.5 parts by weight with respect to 100 parts by weight of an ionizing radiation curable resin.

9. The surface protection film according to claim 1, wherein a thickness of the surface protection layer is 20 to 80% with respect to the average secondary particle diameter of the matting agent.

10. The surface protection film according to claim 1, wherein the substrate film is a polyethylene terephthalate film having a b* value of 3.0 or lower in a L*a*b* color space system.

11. A display used outdoors, wherein the surface protection film according to claim 1 is put on the front surface side.

12. A display screen of a display used outdoors, wherein the surface protection film according to claim 1 is put on the front surface side.

* * * * *

UNITED STATES PATENT AND TRADEMARK OFFICE
CERTIFICATE OF CORRECTION

PATENT NO. : 8,877,334 B2
APPLICATION NO. : 13/260357
DATED : November 4, 2014
INVENTOR(S) : Hironobu Morita et al.

Page 1 of 1

It is certified that error appears in the above-identified patent and that said Letters Patent is hereby corrected as shown below:

In the Claims:

Col. 14, lines 42-45, Claim 6 should read as follows:

6. The surface protection film according to claim 5, wherein the dispersant is included by 0.1 to 2.5 parts by weight with respect to 100 parts by weight of an ionizing radiation curable resin.

Col. 14, lines 46-49, Claim 7 should read as follows:

7. The surface protection film according to claim 5, wherein the dispersant is included by 0.1 to 2.5 parts by weight with respect to 100 parts by weight of an ionizing radiation curable resin.

Signed and Sealed this
Twenty-first Day of April, 2015

Michelle K. Lee
*Director of the United States Patent and Trademark Office*

UNITED STATES PATENT AND TRADEMARK OFFICE
CERTIFICATE OF CORRECTION

PATENT NO.        : 8,877,334 B2
APPLICATION NO.   : 13/260357
DATED             : November 4, 2014
INVENTOR(S)       : Hironobu Morita et al.

Page 1 of 1

It is certified that error appears in the above-identified patent and that said Letters Patent is hereby corrected as shown below:

In the Claims:

Col. 14, lines 42-45, Claim 6 should read as follows:

6. The surface protection film according to claim 5, wherein the dispersant is included by 0.1 to 2.5 parts by weight with respect to 100 parts by weight of an ionizing radiation curable resin.

Col. 14, lines 46-49, Claim 7 should read as follows:

7. The surface protection film according to claim 3, wherein the dispersant is included by 0.1 to 2.5 parts by weight with respect to 100 parts by weight of an ionizing radiation curable resin.

This certificate supersedes the Certificate of Correction issued April 21, 2015.

Signed and Sealed this
Sixteenth Day of February, 2016

Michelle K. Lee
*Director of the United States Patent and Trademark Office*